(12) United States Patent
Kim

(10) Patent No.: US 6,285,789 B1
(45) Date of Patent: *Sep. 4, 2001

(54) VARIABLE LENGTH CODE DECODER FOR MPEG

(75) Inventor: Young Goan Kim, Pusan (KR)

(73) Assignee: Hyundai Electronics Industries Co., Ltd., Kyoungki-Do (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/154,094

(22) Filed: Sep. 16, 1998

(30) Foreign Application Priority Data

Dec. 3, 1997 (KR) ................................................ 97-65566

(51) Int. Cl.$^7$ ............................... G06K 9/36; G06K 9/46
(52) U.S. Cl. .......................................... 382/233; 382/246
(58) Field of Search ..................................... 382/233, 234, 382/246, 248, 250; 341/67, 65, 106

(56) References Cited

U.S. PATENT DOCUMENTS 5,220,325 * 6/1993 Ackland et al. ....................... 341/67
5,666,115 * 9/1997 Colavin ................................. 341/67

OTHER PUBLICATIONS

Shih–Fu Chang et al., "Designing High–Throughput VLC Decoder Part I–Concurrent VLSI Architectures;" IEEE Transactions on Circuits and Systems for Video Technology, Vo. 2, No. 2, Jun. 1992; pp. 187–196.

* cited by examiner

Primary Examiner—Phuoc Tran
(74) Attorney, Agent, or Firm—Fleshner & Kim, LLP

(57) ABSTRACT

A variable length code decoder for MPEG (Motion Picture Expert Group) includes a barrel shifter for outputting the bit stream being decoded, a register for storing the output data of the barrel shifter, a finite state machine for parsing the output data of the barrel shifter and determining whether the data is an ordinary data or a more than 16-bit data, and outputs resultant control signals, a multiplexer for selectively outputting the output data of the barrel shifter or the register based on the control signal, and a decoding units for decoding a variable length code, a header code of a MPEG2 syntax from the output of the multiplexer in accordance with the control signal of the finite state machine. The variable length code decoder obtains a data throughput rate equivalent to the using of 32-bit data path.

14 Claims, 2 Drawing Sheets

VARIABLE LENGTH CODE DECODER FOR MPEG

BACKGROUND OF THE INVENTION

1. Field of the Invention

The present invention relates to a variable length code decoder, and more particularly to an variable length code decoder for a motion picture expert group (hereinafter, "MPEG")

2. Description of the Background Art

In general, a variable length coding is a method frequently employed for a non-loss data compression, wherein a fixed length code data is converted to a variable length code data depending upon a statistical characteristic of data. Here, the statistical characteristic of data denotes a property in which the more frequently does an image data occur, the shorter codeword is assigned, and the less frequently the longer codeword.

Likewise, when codewords are assigned to all the image data, an average length of codewords may be compressed shorter than that of the codewords of the original data. The image data compression technique of MPEG1 or MPEG2 is adapted in a system of high definition (HD) television to realize an image data playback and high definition.

In order to realize such an image data compression technique, there is required a decoder for fast decoding and processing the codeword length of the compressed image data.

As shown in FIG. 1, the conventional variable length code decoder includes: a bit stream buffer 10 for reading data encoded in an external memory control unit (not shown), temporarily storing therein the read data to reconstitute in 16-bit units, and outputting the resultant data; a data feeding unit 20 for aligning 16-bit unit data outputted from the bit stream buffer 10 to form 32-bit units; a barrel shifter 30 for shifting the data received from the data feeding unit 20, removing unnecessary data or previously decoded data, and outputting the data for being decoded in 16-bit units; a register 40 for temporarily storing therein the data outputted from the barrel shifter 30; a header detecting unit 50 for detecting a syntax header code for MPEG1 and MPEG2 from the data outputted from the register 40; a variable length code symbol decoding unit 60 for decoding the data of variable length code outputted from the register 40; a finite state machine 70 for parsing the syntax of MPEG1 and MPEG2 by use of the data outputted from the register 40, decoding the fixed length code, and controlling the entire composition unit; a sizing unit 80 for sizing the data decoded in and outputted from the finite state machine 70; a multiplexer 90 for selecting one meaningful signal from respective output data of header detecting unit 50, symbol decoding unit 60 and sizing unit 80; a feeding control unit 100 for controlling the data feeding unit 20 and the barrel shifter 30 in accordance with the signal outputted from the multiplexer 90; a data output unit 110 for outputting respective sizes of data received via register 40 via barrel shifter 30, data decoded in finite state machine 70, data decoded in symbol decoding unit 60 and data outputted from sizing unit 80, to an external main controller (not shown) or an inverse quantizer (not shown) in accordance with the control of the finite state machine 70.

The operation and effects of the thusly constituted conventional variable length code decoder will now be described.

The bit stream buffer 10 reads the data encoded in external memory control unit (not shown) and stores temporarily therein to output the stored data to data feeding unit 20 which aligns 16-bit units of data outputted from the bit stream buffer 10.

The barrel shifter 30 which receives data outputted from the data feeding unit 20 shifts the data according to the control of the feeding control unit 100 to remove unnecessary data or previously decoded data, thereby outputting the data for being decoded in 16-bit units.

The data outputted from the barrel shifter 30 is temporarily stored in the register 40 and then outputted to header detecting unit 50, symbol decoding unit 60, finite state machine 70 and sizing unit 80.

The finite state machine 70 parses the data outputted from the barrel shifter 30 with respect to the syntax of MPEG1 and MPEG2 and decodes the fixed length code, and accordingly a control signal for controlling symbol decoding unit 60, sizing unit 80 and data output unit 110 is outputted.

When the data outputted from barrel shifter 30 is provided with a syntax of MPEG2, the header detecting unit 50 detects a header code from the data outputted from barrel shifter 30 and then outputs the detected data to multiplexer 90 and finite state machine 70.

The symbol decoding unit 60 decodes the data outputted from the barrel shifter 30 into variable length codes under the control of the finite state machine 70, and the decoded data is outputted to the data output unit 110, and also the size of the data is outputted to the multiplexer 90.

The sizing unit 80 determines the size of the data received from the barrel shifter 30, thereby outputting the resultant data to finite state machine 70, multiplexer 90 and data output unit 110.

Then, the data output unit 110 outputs the data outputted from the register 40 or the symbol decoding unit 60 to the external main controller (not shown) or the inverse quantizer (not shown) in accordance with the control of the finite state control unit 70.

Meanwhile, the multiplexer 90 selects one meaningful size of data from the respective sizes of data outputted from multiplexer 90, header detecting unit 50, symbol decoding unit 60 and sizing unit 80 to output the resultant data to the feeding control unit 100 which controls the feeding unit 20 in accordance with the data size and determines the data amount for the shifting and then the determined value is outputted to the barrel shifter 30.

Then, the barrel shifter 30 shifts the data outputted from the feeding unit 20 in accordance with a signal outputted from the feeding control unit 100, removes the unnecessary data or the previously decoded data, and outputs the data for the decoding in 16-bit units. Likewise, the above-described operation is repeatedly carried out.

Because the conventional variable length code decoder employs a 16-bit data path, there are secured several hardware-oriented advantages. However, in order to process data with more than 16-bit units, that is, to process the data in header detecting unit 50, symbol decoding unit 60 and finite state machine 70, there are consumed clocks two times as many, thereby necessitating a complicated processing device for the control.

For example, a DCT (Discrete Cosine Transform) coefficient is 17 bits when maximized. In that case, a reading by a 16-bit processing device does not allow the knowledge of DCT coefficient. Only after the once reading of the subsequent 16-bit data, it is possible to recognize and decode the data value.

The fixed length code (FLC) employed with regard to MPEG1 and MPEG2 is fixed in size. Here, MPEG1 is 28 bits and MPEG2 is 24 bits. In order for the header detecting unit 50 to determine the MPEG2 header code (23 "0"s and one "1"), there are required 24 bits. However, only 16 bits are precessed at one time, so that there is required a register for storing therein the 16 bits which are previously read.

As a result, in order to process such data, there are required a device for storing the previously read data and a control unit for processing the stored data, thereby disadvantageously demanding two times of clocks as many. Further, a desired output is difficult to obtain.

SUMMARY OF THE INVENTION

An object of the present invention is to provide a variable length code decoder for MPEG that substantially obviates at least one of problems or disadvantages of conventional art.

Another object of the present invention is to provide a variable length code decoder for MPEG that decreases a clock consumption and achieves a throughput rate equivalent to a 32-bit data path.

Another object of the present invention is to provide a variable length code decoder for MPEG that prevents an MPEG data parsing and decoding from being delayed.

To achieve the above-described object, there is provided a variable length code decoder for MPEG according to the present invention which is provided with a barrel shifter for outputting the bit stream being decoded, a register for storing the output data of the barrel shifter, a finite state machine for parsing the output data of the barrel shifter and determining whether the data is an ordinary data or a more than 16-bit data, and outputs resultant control signals, a multiplexer for selectively outputting the output data of the barrel shifter or the register based on the control signal, and a decoding units for decoding a variable length code, a header code of a MPEG2 syntax from the output of the multiplexer in accordance with the control signal of the finite state machine.

The object and advantages of the present invention will become more readily apparent from the detailed description given hereinafter. However, it should be understood that the detailed description and specific example, while indicating a preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Figure 1:
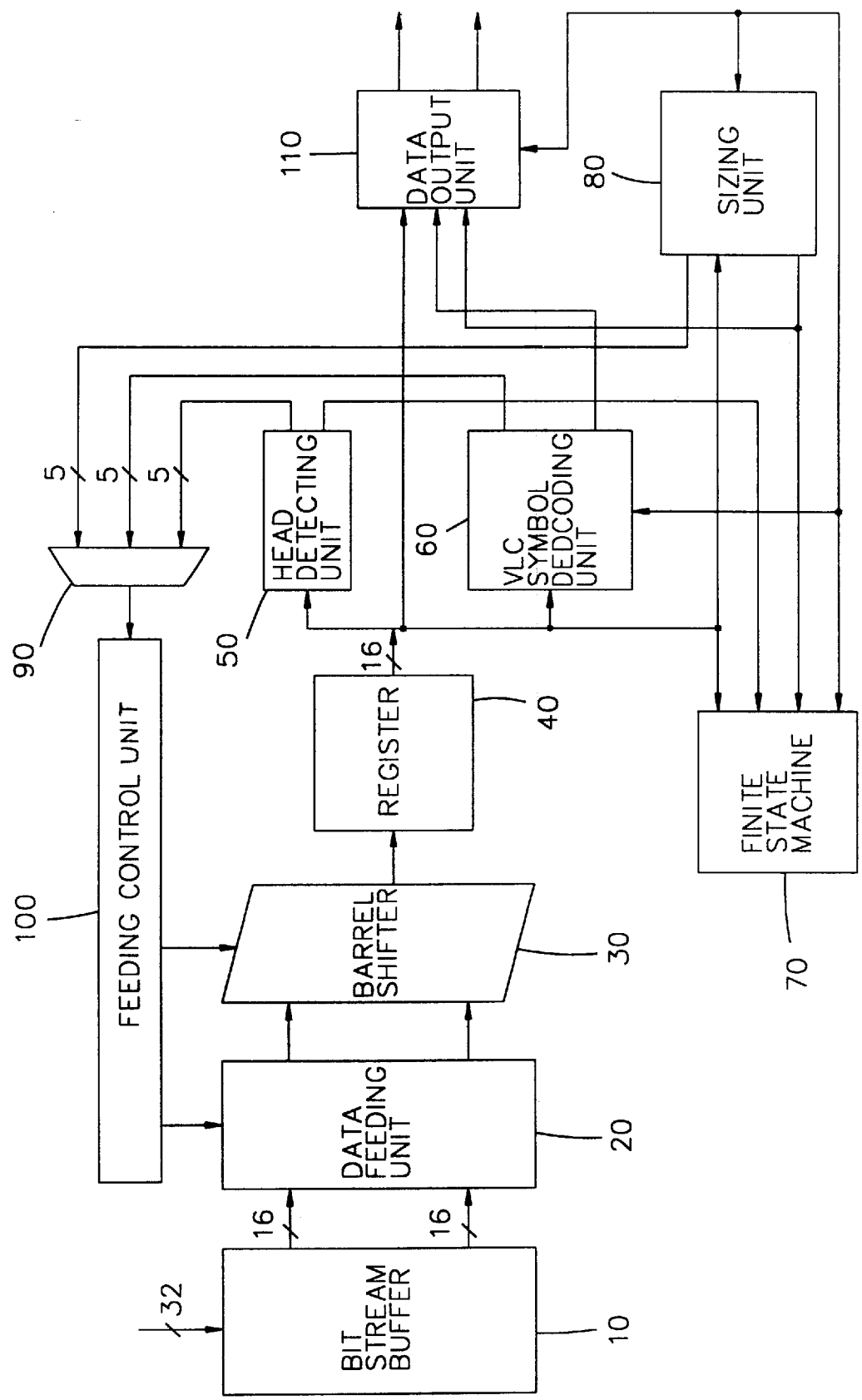
FIG. 1 is a block diagram illustrating a conventional variable length code decoder.
Figure 2:
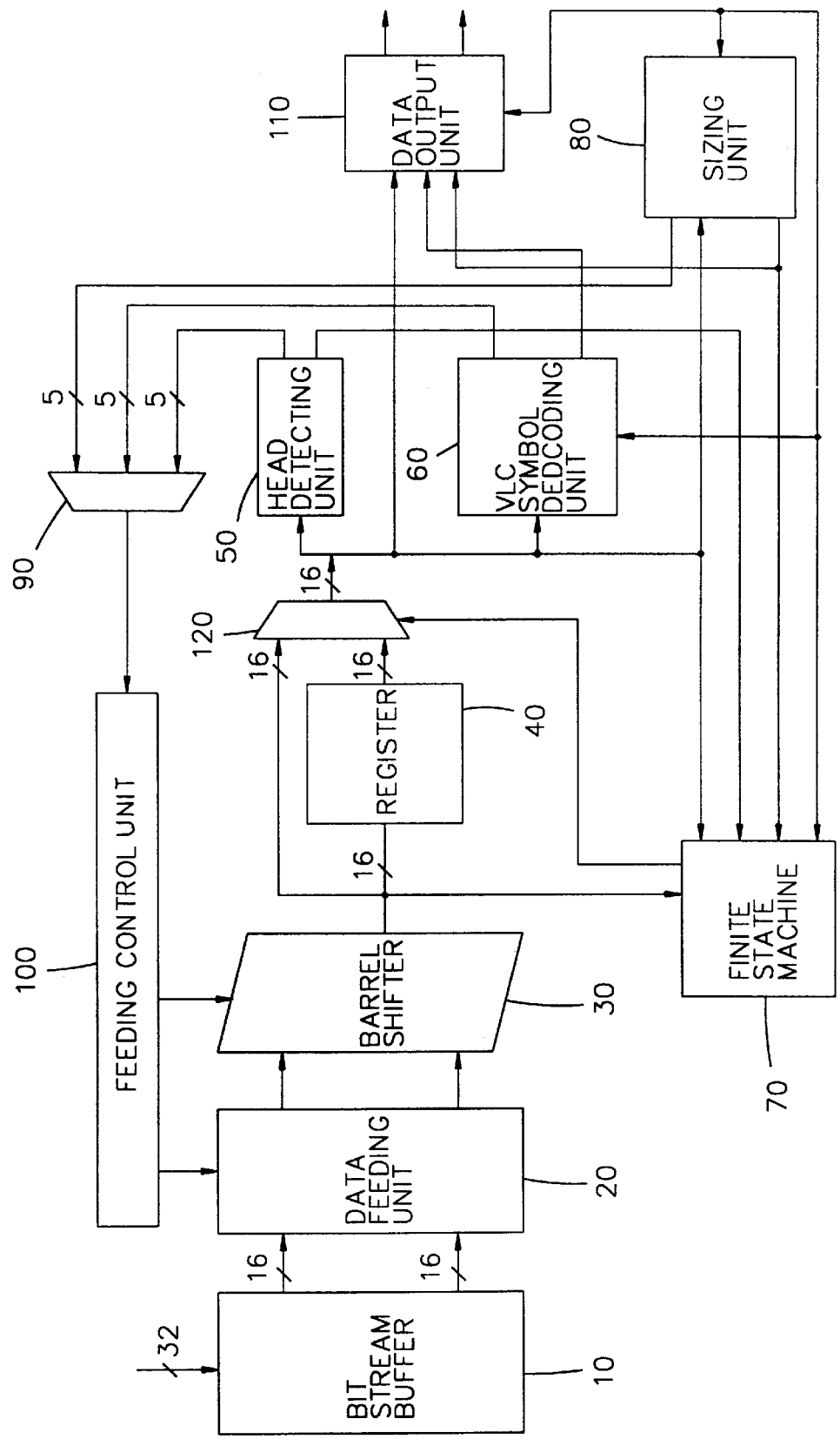
FIG. 2 is a block diagram illustrating a variable length code decoder according to the present invention.

FIG. 2 illustrates a preferred embodiment of a variable length code decoder according to the present invention.

A finite state machine 70 receives the data outputted from the barrel shifter 30 and determine whether the read data is an ordinary data or a data of more than 16 bits to thereby output control signals.

A second multiplexer 120 outputs the data outputted from the barrel shifter 30 or the register 40 based on the control signal of the finite state machine 70. The remaining composition units of the present invention are similar to the composition units described in Figure.

The operation of the preferred embodiment of a variable length code decoder for MPEG according to the present invention will now be described with reference to the drawings.

The bit stream buffer 10 reads the data encoded in external memory control unit (not shown) and stores temporarily therein to output the stored data to data feeding unit 20 which aligns 16-bit units of data outputted from the bit stream buffer 10.

The barrel shifter 30 which receives data outputted from the data feeding unit 20 shifts the data according to the control of the feeding control unit 100 to remove unnecessary data or previously decoded data, thereby outputting the data for being decoded in 16-bit units.

At this time, when the data for the processing is an ordinary data, that is, when the data for the processing is less than 16 bits, the barrel shifter 30 outputs the processed data to the register 40 and the finite state machine 70, and then the register 40 temporarily stores therein and outputs the data to the second multiplexer 120.

The second multiplexer 120 outputs the resultant data to the header detecting unit 50, the symbol decoding unit 60 and the finite state machine 70 in accordance with the control signal outputted from the finite state machine 70. The header detecting unit 50, the symbol decoding unit 60 and the sizing unit 80 are controlled by the control signal outputted from the finite state machine 70, whereby there is carried out a decoding process identical to that of the conventional art. Here, the data output unit 110 serves to externally output the decoded data.

Also, the barrel shifter 30 output relevant data directly to the finite state machine 70 and the second multiplexer 120 without passing through the register 40 in cases wherein: the data for the processing is more than 16 bits, that is, the data is a data of 23 "0"s and one "1" with regard to a start code prefix of the syntax for MPEG1 and MPEG2; an escape code is "000001" in the fixed length code; and the data is a 17-bit of DCT coefficient.

Then, the finite state machine 70 parses and sets which of the above three cases the state of the inputted data belongs to, and the control signal with regard to the set data is outputted to the second multiplexer 120. In other words, the finite state machine 70 comes to see an ordinary 16-bit data outputted from the barrel shifter 30 and at the same time the data which is to be received in 16 bits or less. That is, a 32-bit unit of data is read at the same time.

The finite state machine 70 reads the subsequently inputted data, and if the inputted data is one of the three cases (in case of more than 16 bits), the data is set with regard to the respective cases. That is, when the three patterns are inputted, the finite state machine 70 allows the data which is outputted from the barrel shifter 30 and which has not passed through the register 40 to apply to the header detecting unit 50, the symbol decoding unit 60 and the sizing unit 80 so as to control the second multiplexer 120.

When the data is in a fixed length code, or when the DCT coefficient is 17 bits or in case of a start code prefix for MPEG2 or MPEG1, the header detecting unit 50, the symbol decoding unit 60 and the sizing unit 80 decode the real values of the inputted data in accordance with the control signal which is set in and outputted from the finite state machine 70.

In the likewise operation, a clock consumption is decreased for the benefit of high speed decoding, thereby maintaining a throughput rate equivalent to the processing of 32-bit data.

As described above, the variable length code decoder for MPEG according to the present invention employs a small data path, thereby obtaining a data throughput rate equivalent to the using of 32-bit data path. Further, when there is employed a more than 16-bit data or a fixed length code for MPEG data, the present invention prevents the MPEG data decoding speed from lowering, thereby decreasing clock consumption and hardware-oriented advantages.

As the present invention may be embodied in several forms without departing from the spirit of essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within meets and bounds of the claims, or equivalences of such meets and bounds are therefore intended to embrace the appended claims.

What is claimed is:

1. A variable length code decoder for MPEG (Motion Picture Expert Group), comprising:

a barrel shifter for outputting the bit stream being decoded;

a register for storing the output data of the barrel shifter;

a finite state machine for parsing the output data of the barrel shifter and determining whether the data is ordinary data or more than 16-bit data, and outputs resultant control signals;

a multiplexer coupled to receive inputs from the barrel shifter and the register and the control signal from the finite state machine for selectively outputting the output data of one of the barrel shifter and the register based on the number of bits of data; and a decoding unit for decoding a variable length code, a header code of a MPEG2 syntax from the output of the multiplexer in accordance with the control signal of the finite state machine.

2. The variable length code decoder of claim 1, wherein the multiplexer outputs the output data of the barrel shifter when the data for processing is more than 16-bit data, and outputs the output data of the register when the data for processing is less than 16-bit data.

3. The variable length code decoder of claim 2, wherein the more than 16-bit data is respectively a data with regard to a start code prefix of the syntax for MPEG1 and MPEG2, or an escape code with regard to a fixed length code, or a more than 17-bit data of a DCT (discrete cosine transform) coefficient.

4. The variable length code decoder of claim 2, wherein the ordinary data is less than 16 bits.

5. A decoder circuit for video data, comprising:

a first register, to output a coded bit stream;

a second register, to store the output data of the first register;

a finite state machine, which receives the output data of the first register, determines a data type from between a first type of 16 bits or fewer and a second type of greater than 16 bits, and outputs at least one control signal in accordance with the type of data;

a multiplexer coupled to receive the output of each of the first and second registers, and to selectively output data outputted from one of the first and second registers according to the the type of data; and a decoder coupled to receive and decode the output of the multiplexer according to the control signal.

6. The decoder circuit of claim 5, wherein the first register comprises a barrel shifter.

7. The decoder circuit of claim 5, wherein the multiplexer outputs the output data of the first register when the data type is the second data type, and outputs the output data of the second register when the data type is the first data type.

8. The decoder circuit of claim 5, wherein the second data type comprises one of a start code prefix of a syntax for MPEG1 and MPEG2, an escape code with respect to a fixed length code, and a more than 17-bit data of a discrete cosign transform coefficient.

9. The decoder circuit of claim 5, wherein the decoder receives and decodes a variable length code, a header code of an MPEG2 syntax.

10. The decoder circuit of claim 5, wherein the decoder comprises a header detecting unit, a symbol decoding unit, and a sizing unit.

11. The decoder circuit of claim 5, wherein the first register outputs data directly to the finite state machine and the multiplexer without passing through the second register when the data is one of an escape code, a 17-bit discrete cosign transform (DCT) coefficient, and a data group having more than 16 bits.

12. The decoder circuit of claim 11, wherein the finite state machine parses the data output directly from the first register and determines a class of data from among the escape code, the 17-bit DCT coefficient, and the data group having more than 16 bits, and sets the control signal in accordance with the class.

13. The decoder circuit of claim 11, wherein the escape code is 000001.

14. The decoder circuit of claim 11, wherein data of more than 16 bits comprises data having 23 leading "0s" followed by one "1," and is a start code prefix of the syntax for MPEG1 and MPEG2.

* * * * *